US005510577A

United States Patent [19]

Corrigan

[11] Patent Number: 5,510,577

[45] Date of Patent: Apr. 23, 1996

[54] MULTIPLE WIRE CONNECTOR ASSEMBLY FOR MARINE STREAMER

[75] Inventor: Michael A. Corrigan, The Woodlands, Tex.

[73] Assignee: I/O Exploration Products (U.S.A.), Inc., Stafford, Tex.

[21] Appl. No.: 31,578

[22] Filed: Mar. 15, 1993

[51] Int. Cl.$^6$ .......... H02G 15/02

[52] U.S. Cl. .......... 174/74 R; 367/15

[58] Field of Search .......... 174/68.1, 260, 174/265, 70 R, 74 R, 74 A, 101.5; 367/14, 15, 154

[56] References Cited

U.S. PATENT DOCUMENTS

| | | | |
|---|---|---|---|
| 2,451,516 | 10/1948 | Skobel | 174/151 |
| 2,619,515 | 11/1952 | Doane | 173/328 |
| 2,776,385 | 1/1957 | Modrey | 310/71 |
| 3,605,076 | 9/1971 | Dozier | 339/126 |
| 3,696,329 | 10/1972 | Hazelhurst | 174/101.5 |
| 3,710,006 | 1/1973 | Davis | 174/101.5 |
| 3,772,637 | 11/1973 | Paullus et al. | 29/268 X |
| 3,914,014 | 10/1975 | James | 339/104 |
| 4,204,188 | 5/1980 | Weichart et al. | 367/154 |
| 4,296,481 | 10/1981 | Weiss | 367/20 |
| 4,497,531 | 2/1985 | Baker | 339/94 |
| 4,500,980 | 2/1985 | Copeland | 367/154 |
| 4,503,526 | 3/1985 | Beauducel et al. | 367/20 |
| 4,780,091 | 10/1988 | Shenton | 439/272 |

*Primary Examiner*—Morris H. Nimmo
*Assistant Examiner*—Christopher Horgan
*Attorney, Agent, or Firm*—Tim Headley; John Moetteli; Haynes and Boone

[57] ABSTRACT

The invention disclosed herein is for an improved electrical connector assembly used on couplers and program modules in marine streamers used in offshore seismic exploration. In particular, the invention disclosed herein is comprised of a deformable seal ring with a plurality of holes formed therein through which pass individual conductor wires through which are transmitted signals from various hydrophones disposed along the marine streamer. Deformable nipples are disposed on each side of the seal disk 16 around each of the openings extending through the seal disk. The seal disk and nipples are deformed around the conductor wires passing through the openings in the seal disk through use of a compression disk and spring which provides dynamic spring loading of the seal disk-conductor wire interface, thereby maintaining the integrity of the seal established between those components.

26 Claims, 3 Drawing Sheets

10
12
14
16
18
20
22
23
24
25
26
27
28a
28b
29
30
52
54

22
22
20
18
16
19
32

40
37
38
34
40
22
29
18

30
27
16
28a
30
28b
19
22

MULTIPLE WIRE CONNECTOR ASSEMBLY FOR MARINE STREAMER

BACKGROUND OF THE INVENTION

1. Field of the Invention

The present invention relates generally to marine streamers, and in particular, to a multiple wire sealing mechanism used in marine streamer assemblies.

2. Description of Related Art

In marine seismic surveying, seismic signals are detected by hydrophones mounted in a cable commonly referred to as a marine streamer. The streamer is coupled to a cable tied to a towing ship which, in operation, tows the streamer along a prescribed line of survey. In general, the marine streamer, which may be 2,000 feet or more in length, consists of a central stress member surrounded by a plurality of electrical or optical conductors. The conductors are connected to a corresponding plurality of hydrophone groups, and transmit the hydrophone signals to a recording device on the towing ship. For protection from abrasion and salt water corrosion, the stress member and the conductors are enclosed in a plastic sheath.

Generally speaking, it is preferable to tow the marine streamer at a controlled depth of around 35–40 feet. Typically, a protective clear plastic flexible tube of about 3 inches in diameter surrounds the marine streamer. However, before a seismic shooting project starts, the cable must be balanced so that it can be pulled at a controlled depth. Balancing of the streamer is accomplished by filling the plastic tube with a kerosene-like liquid which is lighter than water (and commonly referred to as "noroma"), and/or by adding lead tape to the exterior of the plastic tube.

A typical marine streamer is comprised of many individual sections which may be up to 300 feet in length. Each section has male and female couplers disposed on each end of the section so that sections may be connected to each other so as to make up the overall marine streamer. The multiple conductors, which may number as many as 40 or more, terminate in a connector insert disposed in the respective male and female couplers, so that the seismic information received from the hydrophone may be transmitted to the towing ship.

One major problem encountered with conventional marine streamer connectors is that the conductors, such as wires and terminating pins disposed in the connector insert, are exposed to the noroma in the given section of marine cable. Additionally, if the external skin of the section is punctured or otherwise damaged, the conductor wires and pins are exposed to salt water. Presently, practitioners of the art attempt to remedy this problem by application of a suitable potting compound to the backside of the connector. Typically, however, this technique has proven ineffective because the potting compound has proven ineffective in preventing the ingress of salt water; and secondly, the presence of a viscous potting compound frustrates the repair and/or replacement of electrical and fiber optic contacts in the coupler.

Similar problems have been encountered with program modules which are typically positioned in conventional marine streamer assemblies. Typical program modules contain mating printed circuit boards to which are attached the conductor wires running through the marine streamer. The program module allows the seismic crew to change the configuration of the hydrophone arrays in a given section that will conduct the seismic sampling.

SUMMARY OF THE INVENTION

The invention disclosed and claimed herein provides an economical and reliable solution to the sealing of multiple wire connectors within a marine streamer cable assembly. The invention disclosed herein provides an economical and reliable solution to many of the aforementioned problems. In particular, the device disclosed herein provides a means for sealing multiple conductor wires that terminate in a marine streamer connector and/or program module housing on such a marine streamer.

In one embodiment, the invention is comprised of a deformable sealing disk, a compression disk and a connector insert, each having a plurality of openings through which pass the multiple conductors. The sealing disk is disposed between the connector insert and the compression disk. The compression disk is spring loaded so as to force the sealed disk against the connector insert, thereby enhancing the sealing between the openings in the seal disk and each of the individual conductor wires.

In a particularly preferred embodiment, the seal disk has conical shaped nipples disposed on each side of the seal disk around the openings in the seal disk. The nipples are adapted to engaged corresponding conical shaped recesses formed in the compression disk and the connector insert disposed on each side of the seal disk. In a preferred embodiment, the nipples and recesses are defined by an apex angle, and the apex angle of the nipples is greater than the apex angle of the recesses. Thus, when the nipples are engaged with the recesses, the nipples may be deformed and urged against the conductor wires extending through the openings in the seal disk. The improved connector disclosed herein is also spring loaded such that a dynamic seal is established between the seal disk and each of the plurality of wires extending therethrough. The present invention may also be employed in a program module on a marine streamer connection.

Thus, the invention disclosed and claimed herein provides a efficient reliable and economical means for improving the sealing of multiple connector wires that terminate in couplers used on marine streamer cables. In particular, the present invention prevents the ingress of salt water into the coupler contact region, and enhances the repairability of such couplers as it avoids use of prior art potting the compounds that inhibit the repair of such connector assemblies.

DETAILED DESCRIPTION OF PREFERRED EMBODIMENTS

Figures 1A, 1B:
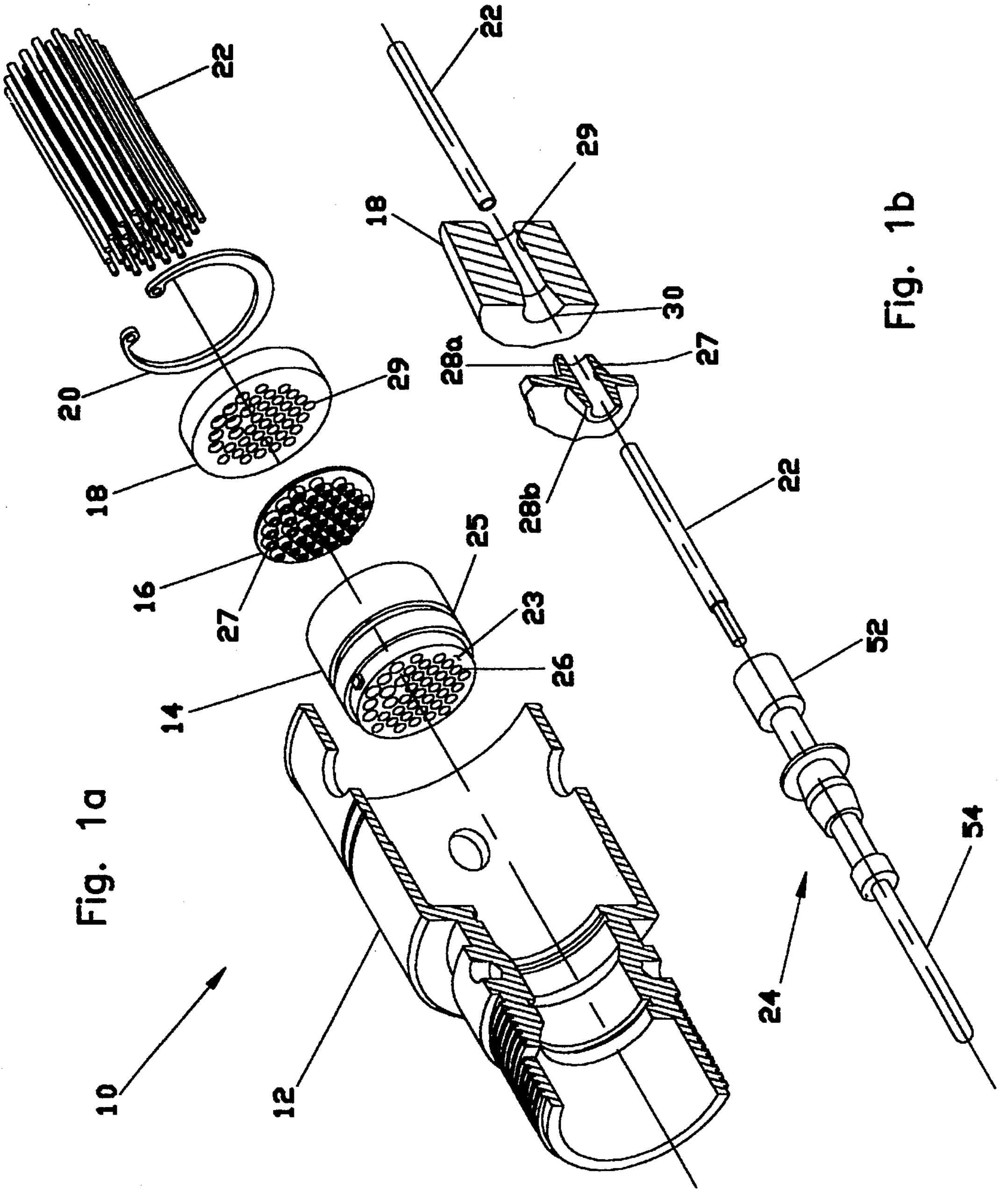
FIGS. 1*a* and 1*b* is a perspective view of an improved marine streamer connector assembly in accordance with the present invention.

Referring now to FIGS. 1*a*and 1*b* therein is depicted an exemplary connector assembly 10 in accordance with the present invention. Connector assembly 10 includes a coupler housing 12, a connector insert 14, a seal disk 16, seal compression disk 18, spring 20 and a plurality of conductor wires 22. The connector insert 14, seal disk 16, and compression disk 18, each have a plurality of openings 26, 27, 29, respectively formed therethrough, through which pass the conductor wires 22. An elastomeric O-ring (not shown) may be installed in groove 25 in connector insert 14 so as to provide a seal between connector insert 14 and coupler housing 12.

The contacts 24 are installed in connector insert 14 by first threading conductor wires 22 through holes 29 and 27 in seal compression disk 18 and seal disk 16, respectively. Thereafter, the conductor wires are inserted into rear end 52 of contacts 24 and are thereafter crimped. Next, the contacts 24 are inserted into connector insert 14 until they lock into place internally within connector insert 14. Thus, the forward end 54 of contact 24 extends beyond surface 23 of connector insert 14 and engages corresponding female contacts installed in a similar fashion in the mating coupler (not shown).

In a particularly preferred embodiment, the seal disk 16 has generally conical shaped nipples **28*a* and 28*b* formed on each side of the seal disk 16 around each of the openings 27 in the disk. The conical nipples 28*a* on one side of seal disk 16 are adapted to engage generally conical shaped recesses 30 formed in compression disk 18 around openings 29. Conical nipples 28*b* on the opposite side of seal disk 16 are adapted to engage generally conical shaped recesses 31 formed in sealing face 33, around openings 26, of connector insert 14. The generally conical shaped recesses 31 formed in sealing face 33 of connector insert 14 need not be identical in size or depth to the recesses 30 formed in compression disk 18. Recesses 31 in connector insert 14 will preferably be of a size and shape relative to nipples 28*b* of seal disk 16 so as to deform nipples 28*b* when seal disk 16 engages sealing face 33 of connector insert 14** when the connector is assembled.

Figure 2:
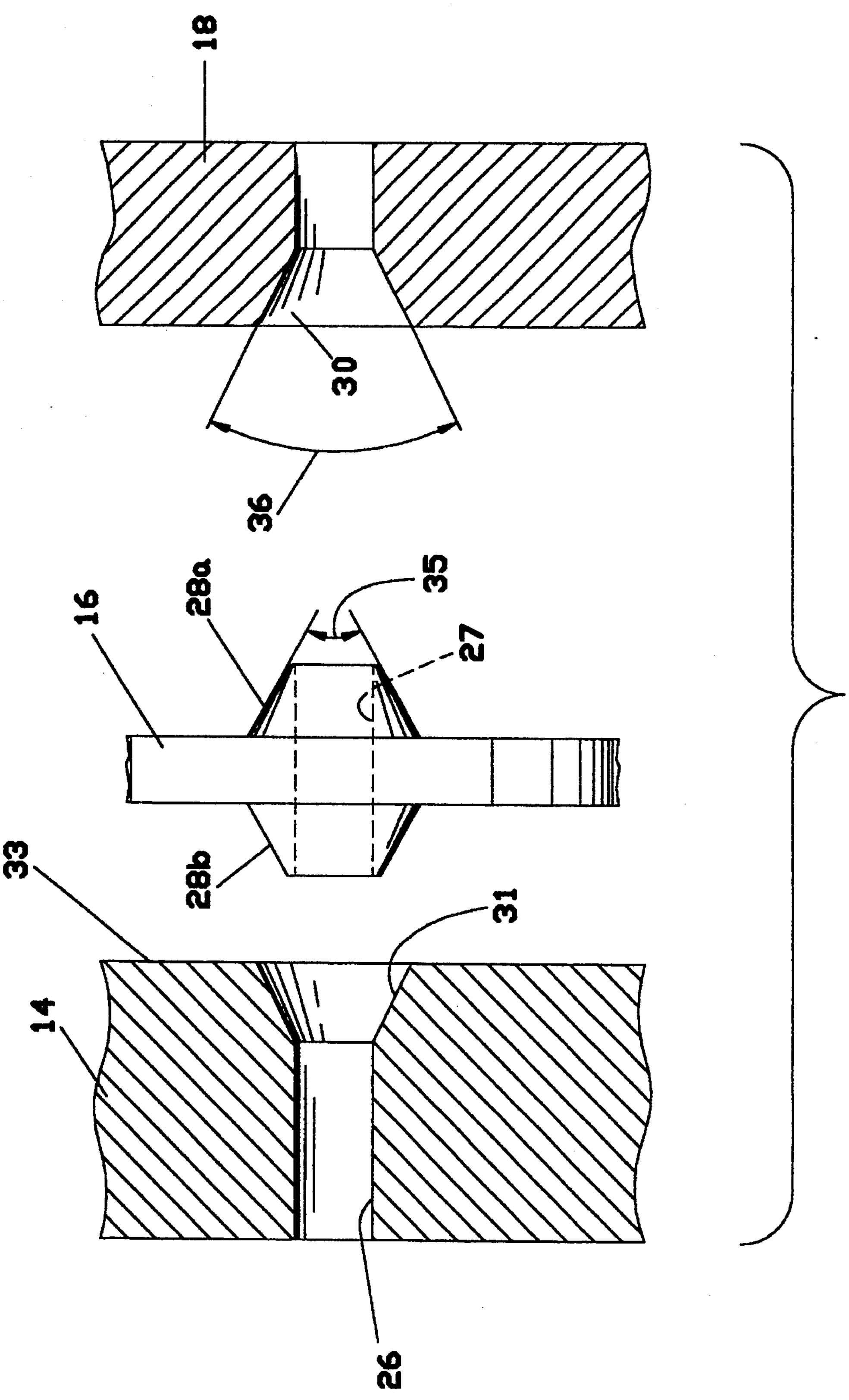
FIG. 2 is a fragmentary side view of the connector insert, seal disk, and compression disk of the connector assembly of FIG. 1.

In a preferred embodiment, the nipples **28*a* and 28*b*, and corresponding recesses 30 and 31 are conical in shape and may be defined by the apex angle of the conical shape for the nipples and the recesses as shown in FIG. 2. The apex angle 35 of each nipple of each set of nipples 28*a* and 28*b* is greater than the apex angle 36 of the recesses 30 and 31 so that when urged into engagement, the nipples 28*a* and 28*b* will be compressed and deform around the wire 22** extending through the openings through the nipple. Although the proposed embodiment of the invention utilizes a seal disk with generally conical shaped nipples and a compression disk and connector insert, each having generally conical shaped recesses, other geometric configurations which will facilitate compression/deformation of the elastomeric seal disk around the conductor wires when the seal disk is engaged with the compression disk may also be utilized.

The seal disk 16 of the present invention may be made of any elastomeric material, preferably flurosilicone. The coupler housing 12 may be made of stainless steel, titanium, or like materials. Spring 20 may also be made of similar metallic materials. The connector insert 14 and compression disk 18 may also be made of such metallic materials or plastic. In a particularly preferred embodiment, the connector insert 14 and compression disk 18 are plastic.

Another connector assembly in accordance with the present invention is disclosed in FIGS. **3*a* and 3*b* wherein a program module assembly 34** is shown. The program module allows the seismic crew to change the configuration of the hydrophone arrays in a given section that will conduct the seismic sampling.

Program module assembly 34.includes a program module housing 37 with passageway 40 formed therethrough and dry area 38 formed therein. The wire sealing mechanism employed in the program module assembly 34 is similar to that previously described relative to connector assembly 10. However, the compression disk as disclosed in the present invention is slightly modified for use in program module assembly 34.

In program module assembly 34, a seal disk 16 is retained between a modified seal compression disk 19 and seal compression disk 18. Since only some of the conductor wires 22 terminate in the dry area 38 in program module housing 37, e.g., only 30 of 40 conductor wires 22 may terminate in the program module housing, only the requisite number of holes, in this example 30, is drilled through modified seal compression disk 19. Otherwise, the sealing mechanism discussed above in relation to the marine coupler is the same, i.e., the nipples **28*a* and 28*b* on seal disk 16 engage corresponding recesses 30 in seal compression disk 18 and modified seal compression disk 19, respectively. Likewise, the nipples and recesses used in the program module assembly have apex angles as previously described for the marine streamer coupler such that, upon engagement, the nipples tend to deform around the wires 22 extending through seal disk 16. The nipples 28*b* on seal disk 16, through which there are no wires 22 passing, rests against the portion of modified seal compression disk 19 that has no holes drilled through it. Of course, a custom manufactured seal disk could be made with only the requisite number of holes and nipples through the seal disk. Additionally, an O-ring seal 32 may be disposed around modified seal compression disk 19 so that it may be sealingly engaged to program module housing 37**.

The dry area 38 of the program module housing 37 contains mating printed circuit boards (not shown) to each of which are attached the conductor wires 22 that terminate therein. The conductor wires 22 that do not terminate in the program module housing 37 can be passed through passageway 40 formed in program module housing 37.

Figures 3A, 3B:
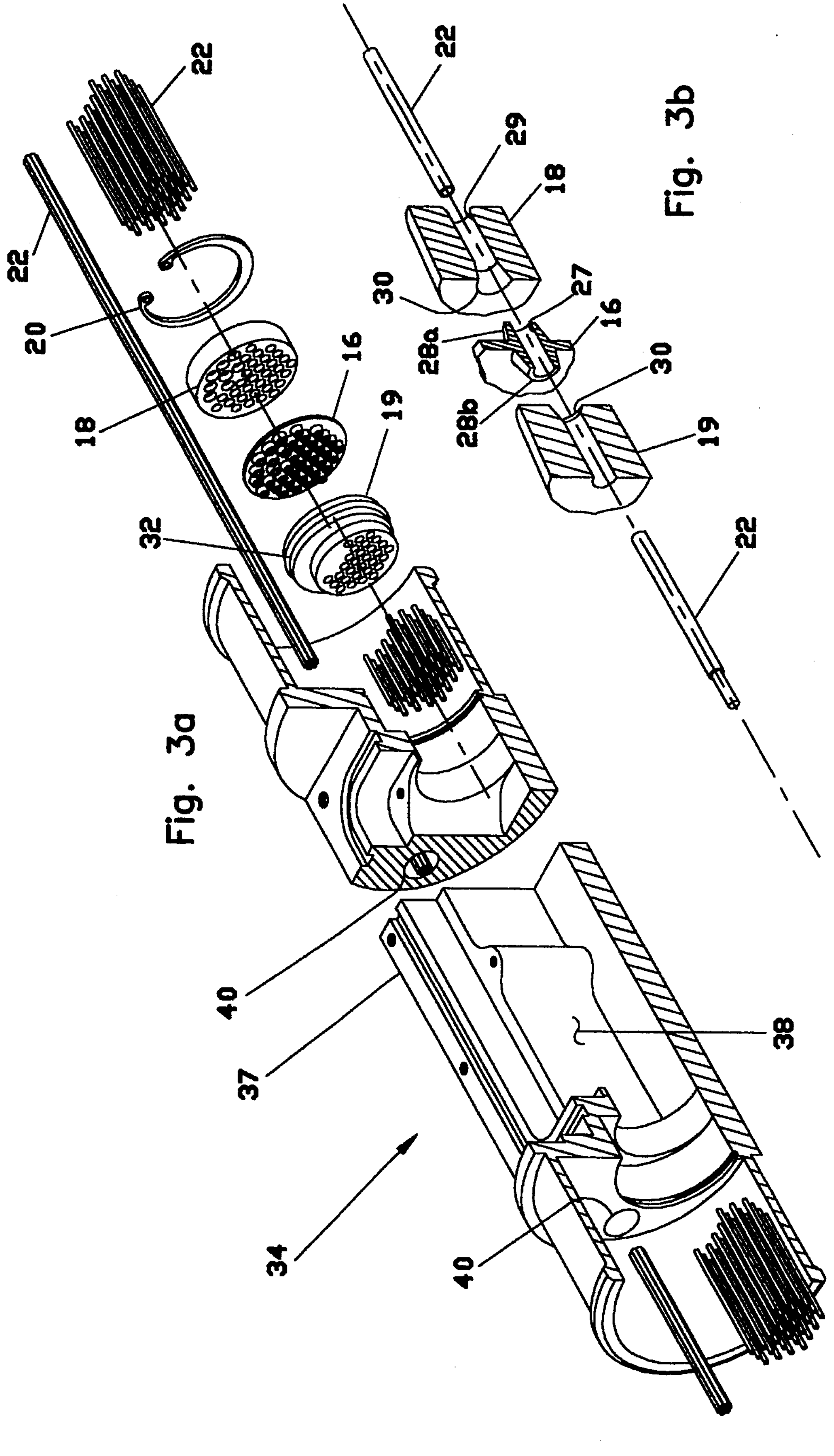
FIGS. 3*a* and 3*b* a perspective view of an improved connector for sealingly terminating conductors in a program module of a marine streamer, also in accordance with the present invention.

The spring 20 is configured such that, when installed, it maintains a positive force on compression disk 18 that tends to bias compression disk 18 into engagement with seal disk 16. The spring is selected and the coupler assembly and program module assembly are dimensioned so as to provide a biasing load of approximately 40±10 pounds on the compression disk. In turn, seal disk 16 is forced against connector insert 14 (or modified seal compression disk 19 in the case of a program module), thereby causing nipples **28*a* and 28*b* to engage the corresponding recesses in the adjoining part and be compressed and deformed against the conductor wires 22 extending through the openings 27 in the seal disk 16. In a particularly preferred embodiment, as shown in FIG. 1, the spring 20 is a bowed snap ring and engages the compression disk 18 and coupler housing 12. While in another preferred embodiment, as shown in FIG. 3, the spring 20 engages the compression disk 18 and program module housing 37. In a particularly preferred embodiment, the spring 20 is a bowed snap ring made from stainless steel (Truarc® Model No. N5001-125-H sold by Waldes Kohinoor, Inc., Long Island, N.Y. 11101). However, the invention should not be considered limited as to the spring configurations disclosed in the preferred embodiment; rather, all springs, or other retention devices, of whatever configuration, that can maintain a positive force on the compression disk 18 so as to bias it into engagement with seal disk 16** should be considered within the scope of the claimed invention.

The wire sealing mechanism disclosed herein provides an effective means for enhancing the sealing of the plurality of conductor wires extending through a marine cable streamer. In particular, after the plurality of wires 22 are extended through each of the compression disk 18, seal disk 16 and connector insert 14 (or modified seal compression disk 19 as used in the program module assembly 34), compression disk 18 is forced against seal disk 16 with the sufficient force to cause nipples 28*a* and 28*b* to deflect and engage wires 22 extending through disk 16. Spring 20 is installed behind compression disk 18 thereby providing dynamic spring loading of the rubber seal around each of the individual conductor wires.

What is claimed is:

1. A marine streamer connector, comprising:

a coupler housing;

a connector insert disposed in said coupler housing;

a compression disk;

a deformable seal disk disposed between said connector insert and said compression disk; and each of said connector insert, seal disk, and compression disk having at least one opening therethrough.

2. A marine streamer connector, as recited in claim 1, further comprising a spring disposed adjacent said compression disk so as to urge said compression disk against said seal disk with sufficient force to compress said seal disk against said conductor wires extending through the openings in said seal disk.

3. A marine streamer connector, as recited in claim 1, further comprising a deformable nipple disposed around each of said openings on at least one side of said seal disk, each of said nipples adapted for engagement with a corresponding recess disposed around each of said openings in one of said connector insert and said compression disk.

4. A marine streamer connector, as recited in claim 1, wherein said deformable nipples are an integral portion of said seal disk.

5. A marine streamer connector, as recited in claim 3, wherein each of said nipples and said recesses are of a generally conical shape and the slope of the sides of said nipples is less than the slope of the sides of the corresponding recesses.

6. A marine streamer as recited in claim 2, wherein said spring is a bowed snap ring.

7. A marine streamer, as recited in claim 2, wherein said spring is adapted to engage said compression disk and said connector insert.

8. A marine streamer, as recited in claim 2, wherein said spring is adapted to engage said compression disk and said coupler housing.

9. A marine streamer connector, comprising:

a coupler housing;

a connector insert disposed in said coupler housing therein;

a compression disk;

a seal disk disposed between said connector insert and said compression disk;

each of said connector insert, seal disk, and compression disk having a plurality of openings formed therethrough, each of said openings adapted for receiving a conductor wire passing through each of said openings;

said seal disk having a generally conically shaped deformable nipple disposed on each side of said disc around each of said openings in said seal disk, said nipples adapted for engagement with corresponding conically shaped recesses formed in each of said connector insert and said compression disk; and a spring disposed adjacent said compression disk so as to urge said compression disk against said seal disk with sufficient force to compress said nipples of said seal disk against said conductor wires extending through the openings in said seal disk.

10. A marine streamer connector, as recited in claim 9, wherein the slope of the sides of each of said conically shaped nipples is less than the slope of the sides of the corresponding conically shaped.

11. A marine streamer connector, as recited in claim 9, wherein said spring is a bowed snap ring.

12. A marine streamer connectors, as recited in claim 9, wherein said spring engages said compression disk and said connector insert.

13. A marine streamer connector, as recited in claim 9, wherein said spring engages said compression disk and said coupler housing.

14. A marine steamer connector, comprising:

a coupler housing;

a connector insert disposed in said coupler housing;

a compression disk;

a seal disk disposed between said connector insert and said compression disk;

each of said connector insert, seal disk, and compression disk having a plurality of openings formed therethrough, each of said openings adapted for receiving a conductor wire passing through each of said openings;

said seal disk having a conically shaped deformable nipple disposed on each side of said seal disk around each of said openings in said seal disk, said nipples adapted for engagement with corresponding conically shaped recesses formed in each of said connector insert and compression disk;

said conically shaped nipples and recesses, wherein the slope of the sides of said nipples is less than the slope of the sides of the corresponding recesses; and a spring disposed adjacent said compression disk and engaging each of said compression disk and connector insert so as to urge said compression disk against said seal disk with sufficient force to compress said seal disk against said conductor wires extending through the openings in said seal disk.

15. A marine streamer connector, as recited in claim 14, wherein said spring is a bowed snap ring.

16. A marine streamer program module, comprising:

a program module housing having a dry area formed therein;

a first compression disk disposed within said housing adjacent said dry area in said housing;

a second compression disk;

a seal disk disposed between said first compression disk and said second compression disk;

each of said first compression disk, seal disk, and second compression disk having a plurality of openings formed therethrough, each of said openings adapted for receiving a conductor wire passing through each of said openings; and a spring disposed adjacent said second compression disk so as to urge said second compression disk against said seal disk with sufficient force to compress said seal disk against said conductor wires extending through the openings in said seal disk.

17. A marine streamer program module, as recited in claim 16, further comprising a deformable nipple disposed around each of said openings on at least one side of said seal disk, each of said nipples adapted for engagement with a corresponding recess disposed around each of said openings in one of said first and second compression disks.

18. A marine steamer program module, as recited in claim 17, wherein each of said nipples and said recesses are conically shaped and the slope of the sides of each of said nipples is less than the slope of the sides of the corresponding recesses.

19. A marine streamer program module, as recited in claim 16, wherein said spring is a bowed snap ring.

20. A marine streamer, as recited in claim 16, wherein said spring is adapted to engage said compression disk and said housing.

21. A marine streamer program module, as recited in claim 16, further comprises an O-ring seal disposed between said first compression disk and said housing.

22. A marine streamer program module, comprising:

a program module housing having a dry area formed therein;

a first compression disk disposed within said housing adjacent said dry area in said housing;

a second compression disk;

a seal disk disposed between said first compression disk and said second compression disk;

each of said first compression disk, seal disk, and second compression disk having a plurality of openings formed therethrough, each of said openings adapted for receiving a conductor wire passing through each of said openings;

said seal disk having a deformable conically shaped nipple disposed on each side of said seal disk around each of said openings in said seal disk, said nipples adapted for engagement with corresponding conically shaped recesses formed in each of said first and second compression disk; and a spring disposed adjacent said second compression disk so as to urge said second compression disk against said seal disk with sufficient force to compress said nipples of said seal disk against said conductor wires extending through the openings in said seal disk.

23. A marine steamer program module, as recited in claim 22, wherein the slope of the sides of each of said conically shaped recesses is greater than the slope of the sides of the corresponding conically shaped nipples.

24. A marine streamer program module, as recited in claim 22, wherein said spring is a bowed snap ring.

25. A marine streamer, as recited in claim 22, wherein said spring means engages said second compression disk and said housing.

26. A marine streamer program module, as recited in claim 22, further comprises an O-ring seal disposed between said first compression disk and said housing.

* * * * *